US007130801B2

(12) United States Patent
Kitahara et al.

(10) Patent No.: US 7,130,801 B2
(45) Date of Patent: Oct. 31, 2006

(54) METHOD FOR SPEECH INTERPRETATION SERVICE AND SPEECH INTERPRETATION SERVER

(75) Inventors: Yoshinori Kitahara, Tachikawa (JP); Yasunari Obuchi, Kokubunji (JP); Atsuko Koizumi, Sagamihara (JP); Seiki Mizutani, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 587 days.

(21) Appl. No.: 09/811,442

(22) Filed: Mar. 20, 2001

(65) Prior Publication Data
US 2002/0046035 A1 Apr. 18, 2002

(30) Foreign Application Priority Data
Oct. 17, 2000 (JP) ............................. 2000-321921

(51) Int. Cl.
G10L 21/00 (2006.01)
(52) U.S. Cl. .................. 704/277; 704/2; 704/5
(58) Field of Classification Search ............... 704/275, 704/270.1, 277, 260, 251, 2, 3, 4, 5, 7, 8, 704/9, 10, 231, 235, 257, 270, 271; 345/3, 345/175, 201.07
See application file for complete search history.

(56) References Cited

U.S. PATENT DOCUMENTS

| 4,882,681 | A | * | 11/1989 | Brotz | ............................. | 704/3 |
| 5,727,057 | A | * | 3/1998 | Emery et al. | .......... | 379/201.07 |
| 5,742,505 | A | * | 4/1998 | Fushimoto et al. | ............ | 704/2 |
| 5,854,997 | A | * | 12/1998 | Sukeda et al. | ................. | 704/3 |
| 6,092,035 | A | * | 7/2000 | Kurachi et al. | ................ | 704/3 |
| 6,161,082 | A | * | 12/2000 | Goldberg et al. | .............. | 704/3 |
| 6,192,332 | B1 | * | 2/2001 | Golding | ......................... | 704/2 |
| 6,356,865 | B1 | * | 3/2002 | Franz et al. | .................... | 704/2 |
| 6,385,586 | B1 | * | 5/2002 | Dietz | ........................ | 704/277 |
| 6,408,272 | B1 | * | 6/2002 | White et al. | ............. | 704/270.1 |
| 6,532,446 | B1 | * | 3/2003 | King | ....................... | 704/270.1 |
| 6,622,123 | B1 | * | 9/2003 | Chanod et al. | ............. | 704/277 |
| 6,917,920 | B1 | | 7/2005 | Koizumi et al. | | |
| 2001/0029455 | A1 | * | 10/2001 | Chin et al. | .................. | 704/277 |

FOREIGN PATENT DOCUMENTS

| JP | 07-141383 | 11/1993 |
| JP | 07-222248 | 2/1994 |
| JP | 09-065424 | 3/1997 |
| JP | 11-125539 | 5/1999 |

* cited by examiner

Primary Examiner—Richemond Dorvil
Assistant Examiner—Huyen X. Vo
(74) Attorney, Agent, or Firm—Reed Smith LLP; Stanley P. Fisher, Esq.; Juan Carlos A. Marquez, Esq.

(57) ABSTRACT

A speech interpretation server, and a method for providing a speech interpretation service, are disclosed. The server includes a speech input for receiving an inputted speech in a first language from a mobile terminal, a speech recognizer that receives the inputted speech and converts the inputted speech into a prescribed symbol string, a language converter that converts the inputted speech converted into the prescribed symbol string into a second language, wherein the second language is different from the first language, and a speech output that outputs the second language to the mobile terminal. The method includes the steps of providing an interpretation server having resident thereon a plurality of registered sentences to be interpreted, activating a translation connection between the mobile terminal and the interpretation server, receiving speech, in a first language, inputted to the mobile terminal via the translation connection, at the interpretation server, recognizing and interpreting the speech inputted based on a comparison of the inputted speech to the plurality of registered sentences to be interpreted, and outputting a translation correspondent to the second language.

15 Claims, 12 Drawing Sheets

FIG. 2

| | |
|---|---|
| 201 — WAVE | |
| 202 — CSTRING | |
| 203 — JAPANESE | |
| 204 — ICNT | |
| 205 — RECOGS (1) | |
| RECOGPNUM (1) | |
| RECOGSNUM (1) | |
| ⋮ | |
| RECOGS (N) | |
| RECOGPNUM (N) | |
| RECOGSNUM (N) | |
| 206 — RESULT | |
| 207 — SYNWAVE | |
| 208 — JCNT | |
| 209 — LANG | |
| 210 — SCENE | |
| 211 — BSENTENCE | |
| 212 — CSENTENCE | |
| 213 — PCAND | |
| 214 — SCAND | |
| 215 — INDEX | |
| ⋮ | |

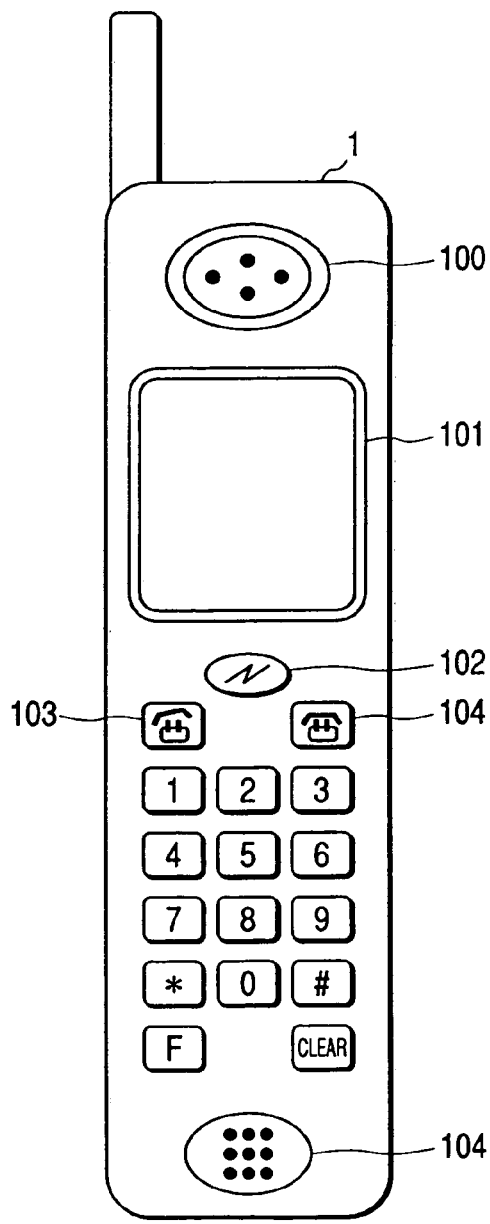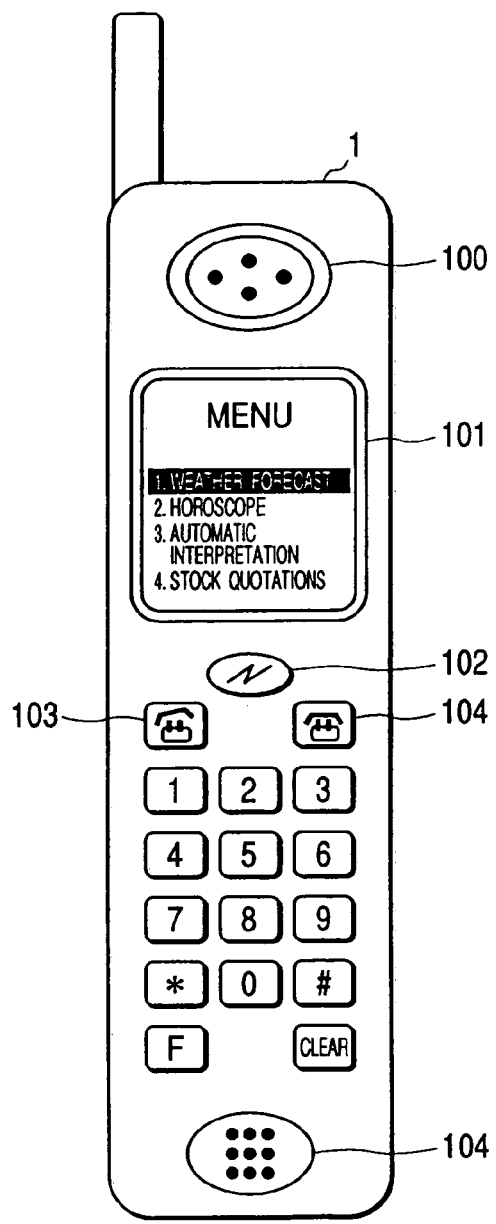

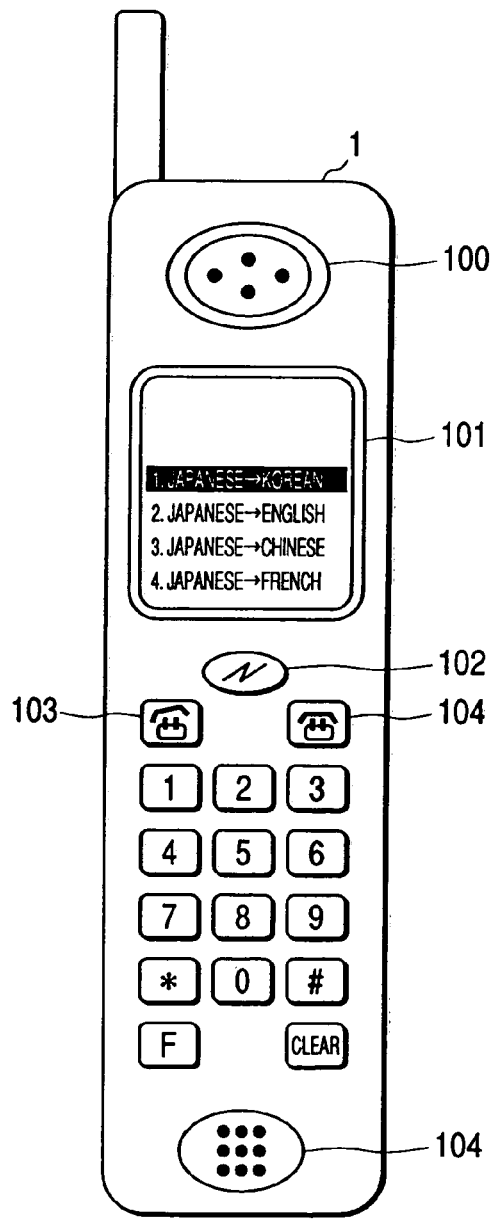
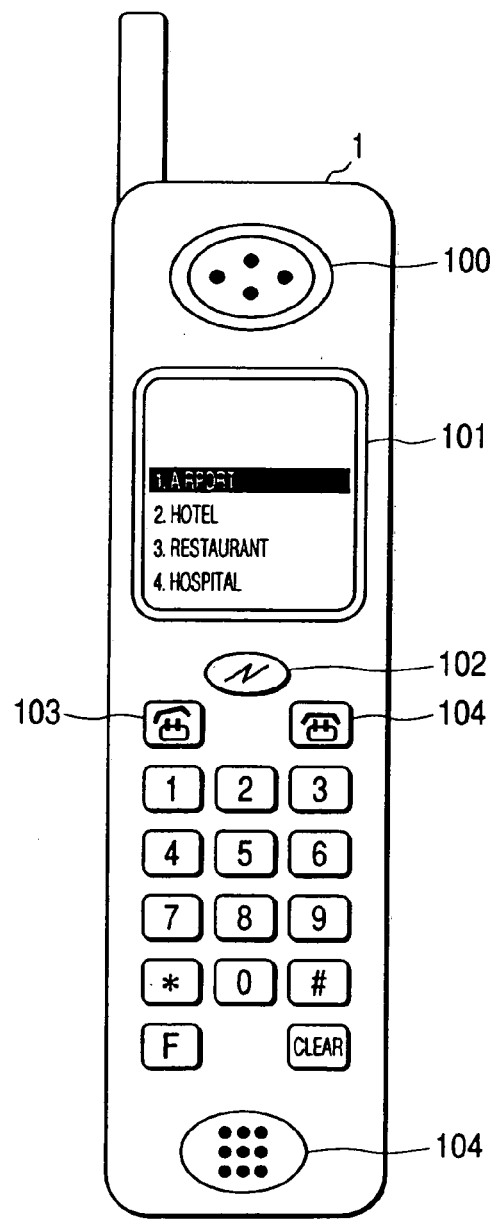

| MODEL SENTENCE NUMBER | SENTENCE NUMBER | TRANSLATED WORDS | | |
|---|---|---|---|---|
| | | 1 | 2 | ... |
| ⋮ | ⋮ | ⋮ | ⋮ | ⋮ |
| 301 — 4 | 1 | ... | I'd like to have a glass of water. | ... |
| 302 — 4 | 2 | ... | Can I see the menu ? | ... |
| 303 — 4 | 3 | ... | I'd like to have a cup of coffee. | ... |
| 304 — 4 | 4 | ... | I'd like to have a spoon. | ... |
| ⋮ | ⋮ | ⋮ | ⋮ | ⋮ |

FIG. 11

| | USER ID (411) | CHARGE (412) |
|---|---|---|
| | ⋮ | ⋮ |
| 401 | 1234 | 100 |
| 402 | 1235 | 0 |
| 403 | 1236 | 300 |
| 404 | 1237 | 850 |
| | ⋮ | ⋮ |

FIG. 12

| | LANGUAGE CLASSIFICATION NUMBER (811) | LANGUAGE CLASSIFICATION (812) |
|---|---|---|
| 801 | 1 | JAPANESE→KOREAN |
| 802 | 2 | JAPANESE→ENGLISH |
| 803 | 3 | JAPANESE→CHINESE |
| 804 | 4 | JAPANESE→FRENCH |
| | ⋮ | ⋮ |

FIG. 13

| SCENE NUMBER (911) | SCENE (912) |
|---|---|
| 1 | AIRPORT |
| 2 | HOTEL |
| 3 | RESTAURANT |
| 4 | HOSPITAL |

901 → row 1, 902 → row 2, 903 → row 3, 904 → row 4

FIG. 14

| SCENE NUMBER (511) | MODEL SENTENCE NUMBER (512) | MODEL SENTENCE (513) |
|---|---|---|
| 1 | 1 | [ ] はどこですか |
| ⋮ | ⋮ | |
| 3 | 1 | こんにちは |
| 3 | 2 | ありがとう |
| 3 | 3 | [ ] はどこですか |
| 3 | 4 | [ ] が欲しいです |
| 3 | 5 | [ ] はありますか |
| 3 | 6 | [ ] て下さい |
| ⋮ | ⋮ | |

FIG. 15

| | MODEL SENTENCE NUMBER | SENTENCE NUMBER | SENTENCE | CHARACTERISTICS VECTOR SEQUENCE |
|---|---|---|---|---|
| 601 | 1 | 1 | こんにちは | A11, A12, ... |
| 602 | 2 | 1 | ありがとう | A21, A22, ... |
| | ⋮ | ⋮ | ⋮ | ⋮ |
| 603 | 4 | 1 | みずがほしいです | A31, A32, ... |
| 604 | 4 | 2 | めにゅーがほしいです | A41, A42, ... |
| 605 | 4 | 3 | こーひーがほしいです | A51, A52, ... |
| 606 | 4 | 4 | すぷーんがほしいです | A61, A62, ... |
| | ⋮ | ⋮ | ⋮ | ⋮ |

FIG. 16

| | COMMAND NUMBER | COMMAND | CHARACTERISTICS VECTOR SEQUENCE |
|---|---|---|---|
| 701 | 1 | かくてい | B11, B12, ... |
| 702 | 2 | つぎ | B21, B22, ... |
| 703 | 3 | サービス終了 | ⋮ |
| | ⋮ | ⋮ | B31, B32, ... |

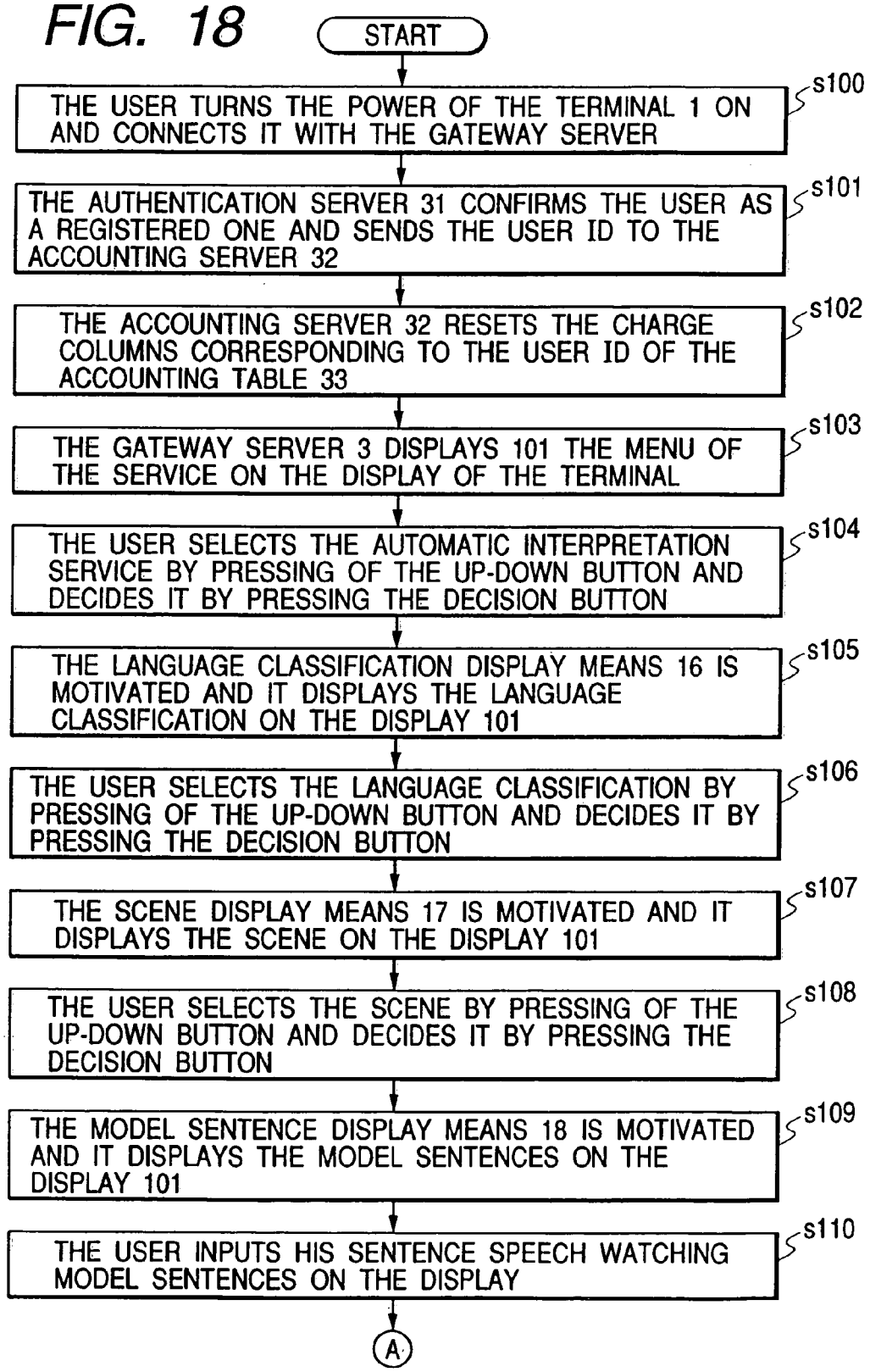

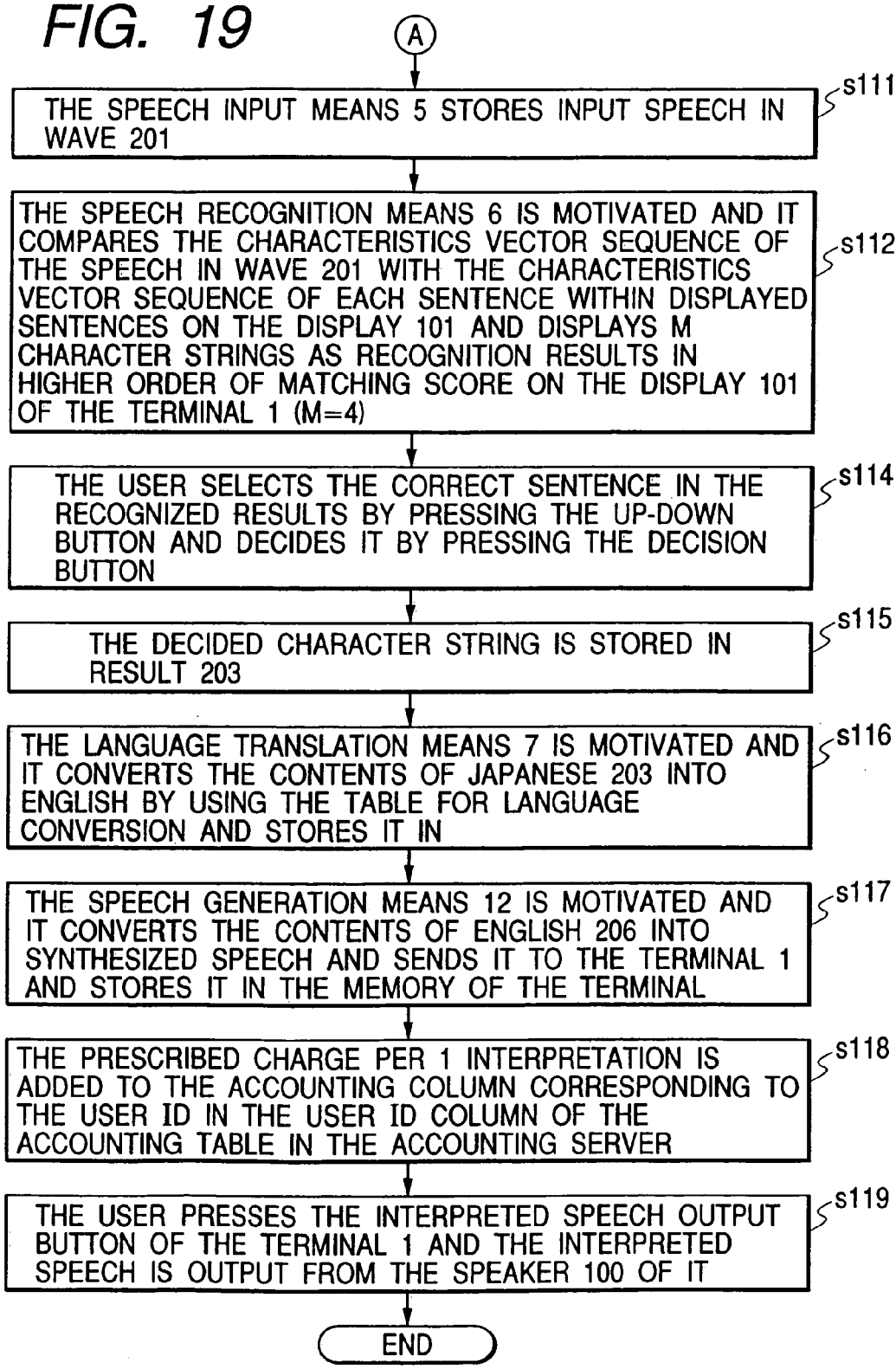

METHOD FOR SPEECH INTERPRETATION SERVICE AND SPEECH INTERPRETATION SERVER

PRIORITY TO FOREIGN APPLICATIONS

This application claims priority to Japanese Patent Application No. P2000-321921 filed on Oct. 17, 2000.

BACKGROUND OF THE INVENTION

1. Field of the Invention

The present invention relates to speech interpretation, and, more particularly, to an automatic interpretation service for translating speech pronounced by a user in a first language into a second language and outputting the translated speech in audio.

2. Description of the Related Art

Japanese Patent Application No. 125539/1999 discloses a compact hand-operable speech interpretation apparatus that translates speech entered in a first language by way of a built-in microphone into a second language and outputs the translated speech in audio through a loudspeaker arranged opposite the microphone. However, such a speech interpretation apparatus, because it is a dedicated apparatus that cannot be used for other purposes, increases the total number of a user's personal effects when the user carries it for actual use, for example, on a lengthy trip.

Japanese Patent Application No. 65424/1997 discloses a speech interpretation system using a combination speech recognition server and wireless mobile terminal. However, as this speech interpretation system allows the user to input nearly any sentence, it does not achieve high accuracy of interpretation, due to the tremendous number of possible spoken sentences, and the difficulty in finding a speech recognizer that can adequately understand a great number of those possible sentences.

Therefore, the need exists for a speech interpretation device and system that does not increase inconvenience while travelling, such as by adding to the number of personal effects, and which achieves improved accuracy of translation over existing methods.

SUMMARY OF THE INVENTION

An object of the present invention, therefore, is to provide a device and system that does not increase inconvenience while travelling, such as by adding to the number of personal effects, and which achieves improved accuracy of translation over existing methods, through the use of a telephone set for conversation and translation, and preferably through the use of a telephone to which mobile Internet access service is available.

According to the invention, a user transmits speech by telephone to an automatic interpretation server, and the speech is returned in a translated form to the user's telephone. When the user first establishes connection from a telephone, preferably a telephone on which mobile Internet access service is available, to a mobile Internet access service gateway server via a mobile Internet access service packet network, the automatic interpretation server allows the user to display a menu of interpretable language on the display screen of the user's telephone, to thereby enable the user to select from the language classification menu the language into which the translation is to be performed. Also, the server preferably allows the user to display an interpretable model sentence scene on the display screen of the user's telephone, to thereby enable the user to select from the scene menu an interpretable sentence scene-of-use. Further, the server allows the user to display a model sentence that can be inputted on the display screen of the user's telephone, to thereby enable the user to input, in audio, that model sentence while watching the model sentence on the screen. Additionally, the automatic interpretation server recognizes the inputted speech using a model sentence dictionary for a limited range of model sentence choices, converts the inputted speech into a translated sentence, and outputs to the telephone terminal, in audio, the translated sentence.

Thus, the present invention provides a device and system that does not increase inconvenience while travelling, such as by adding to the number of personal effects, and which achieves improved accuracy of translation over existing methods, through the use of a telephone set for conversation and translation, and preferably through the use of a telephone to which mobile Internet access service is available.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 2 illustrates an example of data structure of a memory;

FIG. 3 illustrates an example of telephone terminal;

FIG. 4 illustrates an example of service menu displayed on the display of the telephone terminal;

FIG. 5 illustrates an example of interpretable language classification displayed on the display of the telephone terminal;

FIG. 6 illustrates an example of an interpretable scene assortment displayed on the display of the telephone terminal;

FIG. 11 illustrates an example of data structure of an accounting table;

FIG. 12 illustrates an example of data structure of a language classification table;

FIG. 13 illustrates an example of data structure of a scene table;

FIG. 14 illustrates an example of data structure of a model sentence table;

FIG. 15 illustrates an example of data structure of a sentence dictionary;

FIG. 16 illustrates an example of data structure of a command dictionary;

FIG. 18 is a flowchart showing the operation of the automatic interpretation service (Part 1); and FIG. 19 is a flowchart showing the operation of the automatic interpretation service (Part 2).

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in a typical telecommunications system. Those of ordinary skill in the art will recognize that other elements are desirable and/or required in order to implement the present invention. However, because such elements are well known in the art, and because they do not facilitate a better understanding of the present invention, a discussion of such elements is not provided herein.

Figure 1:
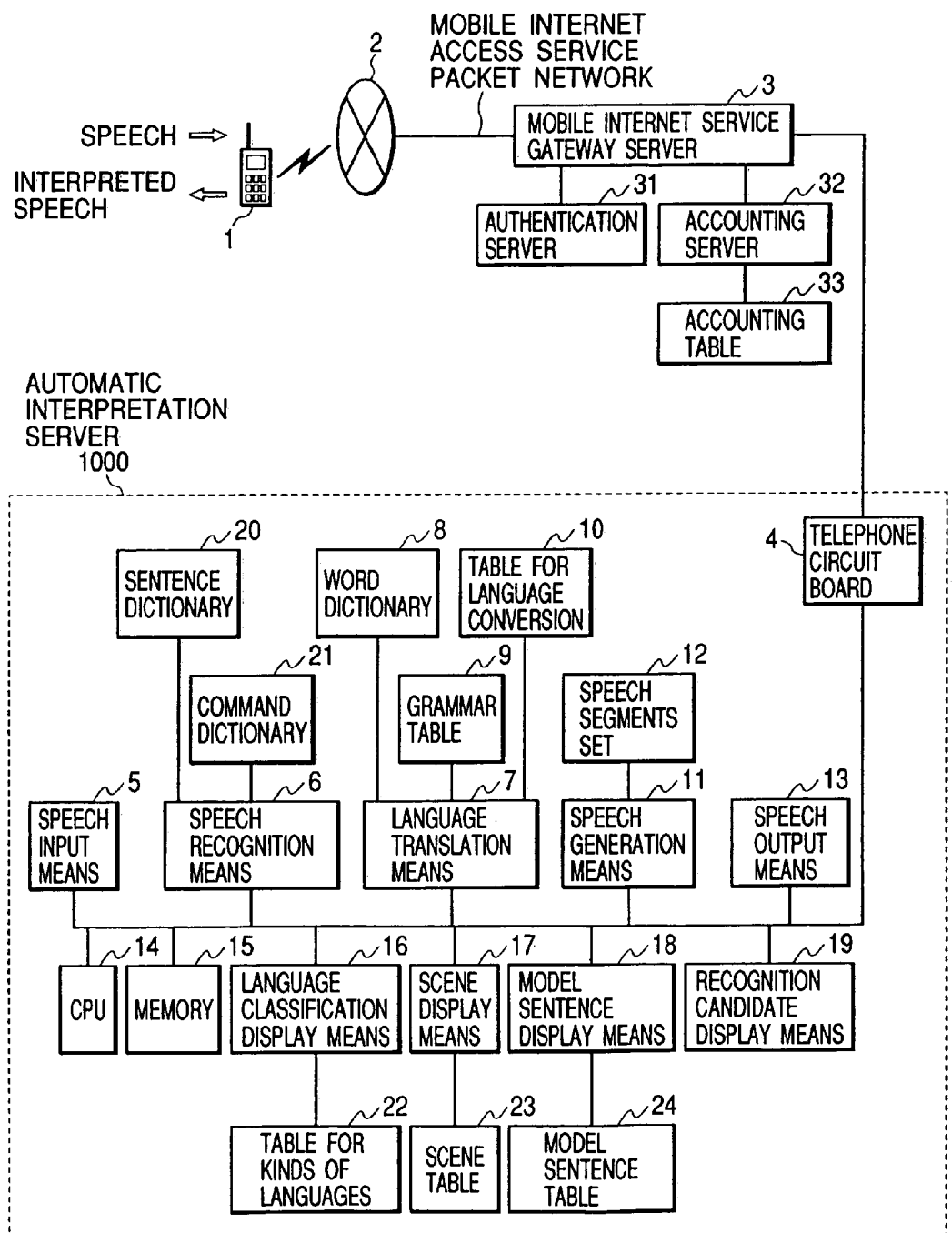
FIG. 1 illustrates the configuration of an automatic interpretation service system.

FIG. 1 is a lock diagram illustrating an automatic interpretation service system. While the present invention relates to speech interpretation, it will be apparent to those skilled in the art that a server includes any device provided with a CPU and a memory, and having a configuration such as the one shown in FIG. 1, such as a personal computer or a work station. Further, although the examples presented herein illustrate the automatic interpretation service for translating English into Japanese, any combination of languages may be made available using the present invention.

The automatic interpretation service includes a telephone terminal 1 to which mobile Internet access service is preferably available, and may include a mobile Internet access service packet network 2 and a mobile Internet access service gateway server 3, and includes a telephone circuit board 4, a speech input 5, a speech recognizer 6, a language translator 7, a word dictionary 8, a grammar table 9, a table for language conversion 10, a speech generator 11, a speech segments set 12, a speech output 13, a CPU 14, a memory 15, a language classification display 16, a scene display 17, a model sentence display 18, a recognition candidate display 19, a sentence dictionary 20, a command dictionary 21, a table for kinds of languages 22, a scene table 23, a model sentence table 24, an authentication server 31, an accounting server 32, and an accounting table 33. The data structure of the memory 15 is shown in FIG. 2. Further, a typical outline of the telephone terminal to which a mobile Internet access service is available is shown in FIG. 3. An exemplary telephone terminal to which a mobile Internet access service is available is a telephone terminal capable of handling dialogue voice and data in the same protocol, although the present invention is applicable to any telephone having access to an automatic interpretation server, either over IP protocol, the telephone network, or both.

Referring now to FIG. 1 and FIG. 3, a power supply to the telephone terminal 1 is turned on, and a connection is established to the gateway server 3 of a center via a network, such as, for example, the mobile Internet access service packet network 2, such as by pressing a button 102 for connection to the mobile Internet access service, and the user is confirmed by the authentication server 31 to be registered for use of the mobile Internet access service. The packet network may allow for the sending of data packets, voice packets, audio signals, or all of these signals, and, as such, may include an I-mode network, a telephone network, or the capability to switch between an I-mode network and the telephone network, such as an automatic switching based on data type, or by a switching at the request of the user. Upon connection to the gateway 3, the user ID is sent to the accounting server 32. The user ID may often be linked to the ID of the telephone terminal 1, such as the caller ID, or the user ID may be entered by the user in combination with a password, for example.

The accounting server 32 has therein an accounting table 33. The data structure of the accounting table 33 is shown in FIG. 11. An ID sent from the authentication server 31 is collated with a cell in the user ID column 411 of the accounting table 33, and the charge column 412 of each cell found matching the ID is reset to zero. For example, if the user ID of the user is "1236", it is identical with a cell 403 indicating "1236" in the user ID column 411 in the accounting table 411, and accordingly the cell matching 403 in the charge column 412 is reset to "0".

Connection to the mobile gateway server 3 is, for example, by a leased line, a mobile network line, a telephone network wireline, a connection through a server, such as the automatic interpretation server, or an Internet or intranet network.

When the telephone terminal 1 to which a mobile Internet access service is available is connected to the mobile gateway server 3, and when the authentication server 31 confirms the user to be registered for use of the mobile Internet access service, the mobile gateway server 3 may display a service menu on the display 101 of the telephone terminal 1, as illustrated in FIG. 4. Although the menus and instructions presented in this exemplary embodiment are generally discussed herein as being displayed as text via, for example, and internet connection gateway server 3, it will be apparent to those skilled in the art that the menus and instructions displaed at the phone may be presented as speech or any type of audio via, for example, a voice over IP connection, or a telephonic audio connection gateway server 3. In the initial service menu, shown in FIG. 4, the first item is preferably shown more conspicuously than the remaining items, such as by the reversal of black and white, to thereby indicate that the first item is selected. Of course, the selected item may be made more conspicuous in any manner known in the art. Alternatively, the options of the menu may be sent in audio to the user as discussed hereinabove.

The user, such as while watching the service menu, presses prescribed buttons, to which the function of vertically shifting the cursor is then assigned, on the telephone terminal 1, until the third item, "automatic interpretation", for example, is highlighted. The user may further press another prescribed button, to which the decision function is assigned, on the telephone terminal 1, in order to fix the selection, i.e. to select the highlighted text, or to select the desired function sent in audio. When the item "automatic interpretation" is fixed, the telephone terminal 1 is connected to an automatic interpretation server 1000 via the mobile Internet access service gateway server 3.

The language classification display 16 of the automatic interpretation server 1000 is then actuated, and interpretable language combinations are displayed on the display 101 of the telephone terminal 1, such as from a table for languages 22, as shown in FIG. 5. The table for languages 22 has the data structure shown in FIG. 12, and the language classification display 16 sends each item of language classification 812 in the table to the telephone terminal 1, in order to display the item(s) on the display 101 of the telephone terminal 1, as shown in FIG. 5. In FIG. 5, the first item is shown highlighted in the initial state, to thereby indicate that the first item is selected. The user, preferably while watching the language classification menu, presses the prescribed buttons, to which the function of the shifting cursor is assigned, to select, for example, the item "Japanese-English", and further presses another prescribed button, to which the decision function is assigned, on the telephone terminal 1, in order to fix the selection. When this procedure is followed, the language classification display 16 receives the cursor position on the telephone terminal 1, and stores the number representing that position into LANG 209 on the memory 15. If, for example, speech in Japanese is to be interpreted into English, "2" is stored into LANG 209 on the memory 15, because "Japanese-English" is on the second line.

The designation of language combination may be accomplished by, instead of displaying language classification on the display 101 of the telephone terminal 1 and letting the user select the desired language combination with the vertical shift buttons, composing the display 101 of the telephone terminal 1 as a touch panel display, to thereby allow designation of the desired language combination by touching with a finger or pointer or the like. Additionally, a particular language may be assigned a prescribed telephone number, and the user may thereby enter a telephone number matching the desired language combination using the numeral buttons on the telephone terminal 1.

When the choice of language combination is fixed, the scene display 17 of the automatic interpretation server 1000 is actuated, and interpretable scenes are displayed on the display 101 of the telephone terminal 1 by using a scene table 23 as shown in FIG. 6. The "scene" in this context refers to scenes wherein an interpretation service according to the present invention is likely to be used, such as an "airport", "hotel" or "restaurant". The scene table 23 has a data structure such as that shown in FIG. 13, and the scene display 17 sends each item of scene 912 in the table to the telephone terminal 1 for display on the display 101 of the telephone terminal 1, as shown in FIG. 6. In a preferred embodiment, a library of terms is used to create the model sentences discussed hereinbelow, and this library of term, or the model sentences, are preferably divided by scenes in the scene table 23. In FIG. 6, the first item is shown highlighted in the initial state.

The user, preferably while watching the scene menu, presses the prescribed buttons, to which the function of shifting the cursor is assigned, on the telephone terminal 1, in order to shift the reversal in black and white to, for example, the third item "restaurant", and further presses the another prescribed button, to which the decision function is assigned, on the telephone terminal 1 to fix the selection. When this procedure is followed, the scene display 17 receives the cursor position on the telephone terminal 1, and stores the number representing that position into SCENE 210 on the memory 15. If, for example, interpretation in a restaurant scene is desired, "3" is stored into SCENE 210 on the memory 15, because "restaurant" is on the third line. Alternatively, the designation of scene may be accomplished by, instead of displaying scenes on the display 101 of the telephone terminal 1 and letting the user select the desired scene with the vertical shift buttons, composing the display 101 of the telephone terminal 1 of a touch panel display to allow designation of the desired scene by touching with a finger or pointer or the like. Alternatively, a particular scene may be assigned to a prescribed telephone number, and the user may thereby enter a telephone number matching the desired scene with the numeral buttons on the telephone terminal 1.

Figure 7:
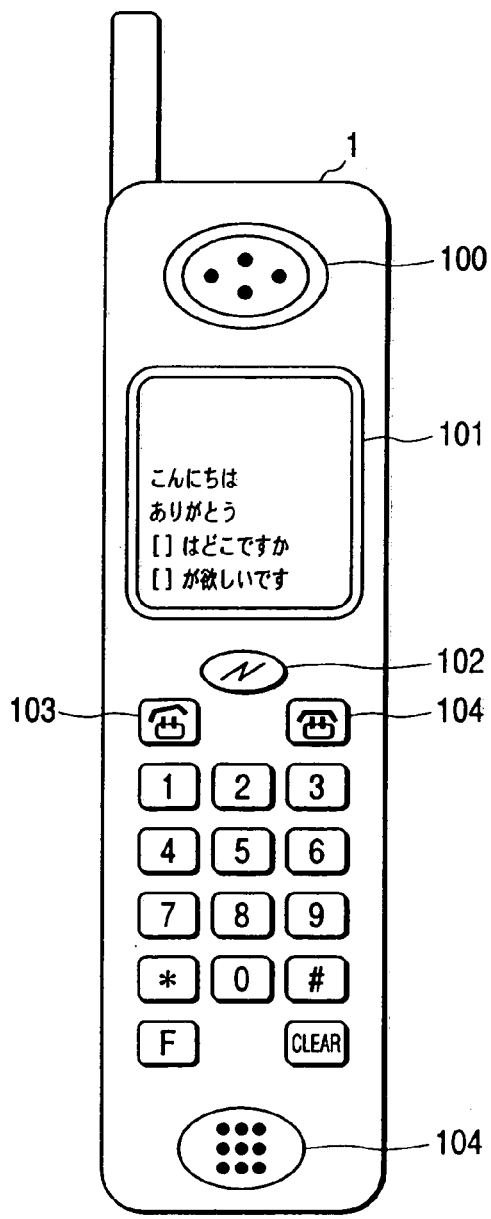
FIG. 7 illustrates an example of an interpretable model sentence assortment displayed on the display of the telephone terminal.

When the scene is fixed, the model sentence display 18 of the automatic interpretation server 1000 is actuated, and the interpretable model sentences are displayed on the display 101 of the telephone terminal 1 by using a model sentence table 24 as shown in FIG. 7. Simultaneously, the speech input 5 of the automatic interpretation server 1000 is actuated. The speech input 5 then enables the system to accept a speech input. The user, preferably while watching the model sentences, pronounces in Japanese a sentence the user desires to have interpreted in, for example, the restaurant scene, into a microphone 104 of the mouthpiece of the telephone terminal 1. For example, the user may desire to have the sentence "Mizu ga hoshii desu" ("I'd like to have a glass of water") in a restaurant scene interpreted into English.

The model sentence table 24 has, for example, the data structure shown in FIG. 14, and the model sentence display 18 sends to the telephone terminal 1, from among the items of scene number 511 in the model sentence table 24, model sentences 513 of values stored in SCENE 210 on the memory 15, successively from "1" in model sentence number 512 onward, on the display 101 of the telephone terminal 1. As "3" is stored in SCENE 210 on the memory 15 in the example cited hereinabove, model sentence 513 of scene number 511 is "3" in the model sentence table 24 of FIG. 14, i.e. items 501, 502, 503 and 504, "Hello", "Thank you", "Where is [ ]" and "I'd like to have [ ]" are sent to the telephone terminal 1, and M sentences at a time are successively displayed on the display 101 of the telephone terminal 1, as shown in FIG. 7. The variable M is set according to the size of the display 101, and is M=4 according to the exemplary embodiment hereinabove.

The model sentences hereinabove include the pattern "I'd like to have [ ]", and thus the user inputs, via speaking, "I'd like to have a glass of water", thereby following the pattern of the model sentence. A prescribed button, to which a function to trigger audio input is assigned, on the telephone terminal 1 may be pressed, prior to pronouncing the sentence, in order to enable the speech input 5 of the automatic interpretation server 1000 to accept a speech input, or the speech input 5 of the automatic interpretation server 1000 may remain enabled to accept a speech input at any time once actuated. A model sentence displayed may be one having a blank slot [ ], as in the above-cited example, a word, a grammar rule, or a complete sentence. The blank slot is preferably a box in which a word, a phrase, or the like, can be placed. For example, in the slot [ ] of "I'd like to have [ ]", the words "water", "coffee" or "ice-cold water" can be placed, for example. Through the displaying of model sentences, sentence patterns are defined in a limited universe, and thereby the accuracy of speech recognition is significantly improved. Further, the displaying of model sentences provides improved convenience and access to the user.

It will be apparent to those skilled in the art that the displayed model sentences referred to hereinabove may, for example, be scrolled successively by pressing the prescribed buttons to which the cursor shifting function is assigned, or multiple sentences may be displayed at one time. However, when the model sentences are displayed, the value of the model sentence number 512 for the first model sentence displayed on the display 101 of the telephone terminal 1, and that of the last displayed model sentence, are respectively stored into BSENTENCE 211 and ESENTENCE 212 on the memory 15. Thus, in the example of FIG. 7, "1" is stored into BSENTENCE 211, and "4", into ESENTENCE 212.

The speech input 5 stores the inputted speech after an analog-to-digital (A/D) conversion on a telephone circuit board 4 into, for example, WAVE 201 on the memory 15. The sampling rate of A/D conversion on the telephone circuit board 4 may be appropriately determined by the user, or by the manufacturer or service provider, and may be, for example, 8 kHz, 11 kHz, 16 kHz or the like.

If the user wishes to cancel the inputted speech and to input another sentence, the user may press a prescribed button to which a canceling function is assigned, on the telephone terminal 1. The prescribed button to which the canceling function is assigned on the telephone terminal 1, when pressed, resets to an initial state, preferably the same state as just prior to the pressing of the prescribed button to which the function to trigger audio input is assigned.

The speech recognizer 6 is then actuated. The speech recognizer 6 reads speech data stored in WAVE 201 on the memory 15, converts that speech data into a characteristic vector sequence, performs collation using a sentence dictionary having the characteristic vector sequence of each spoken sentence, thereby recognizes the speech data, and outputs the recognition candidates. Methods for speech recognition, including that for conversion into the characteristic vector sequence and the collation method, are described in L. Rabiner and B. H. Juang (translated into Japanese under supervision by Sadahiro Furui), *Basics of Speech Recognition*, Book 2, NTT Advance Technology, 1995, pp. 245–304, for example. Other methods for speech recognition may also be used.

The data structure of the sentence dictionary 20 is shown in FIG. 15. The speech recognizer 6 reads speech data stored in WAVE 201 on the memory 15, and carries out speech recognition using the value of the characteristic vector sequence 614 for each item of which the value of the model sentence number 611 in the sentence dictionary 20 is within the range of values stored in BSENTENCE 211 and ESENTENCE 212 on the memory 15. Because "1" is stored in BSENTENCE 211 and "4" in ESENTENCE 212 in the foregoing example, speech recognition is carried out using the value of the characteristic vector sequence 614 for each item of which the value of the model sentence number 611 in the sentence dictionary 20 is from "1" to "4". As a result, the speech is converted into model sentence numbers and sentence numbers of, for example, character strings "can I see the menu?", "I'd like to have a glass of water", "I'd like to have a cup of coffee" and "I'd like to have a spoon", in descending order. Consequently, the model sentence numbers 611, sentence numbers 612 and sentences 613 of these candidates are stored into RECOGPNUM (1), RECOGSNUM (1), RECOGS (1), RECOGPNUM (2), RECOGSNUM (2), RECOGS (2), . . . , RECOGPNUM (N), RECOGSNUM (N) and RECOGS (N) 205 on the memory 15 in descending order. Here, N is the total of all items of which the values of the model sentence number 111 in the sentence dictionary 20 are within the range of values stored in BSENTENCE 211 and ESENTENCE 212 on the memory 15.

Figure 8:
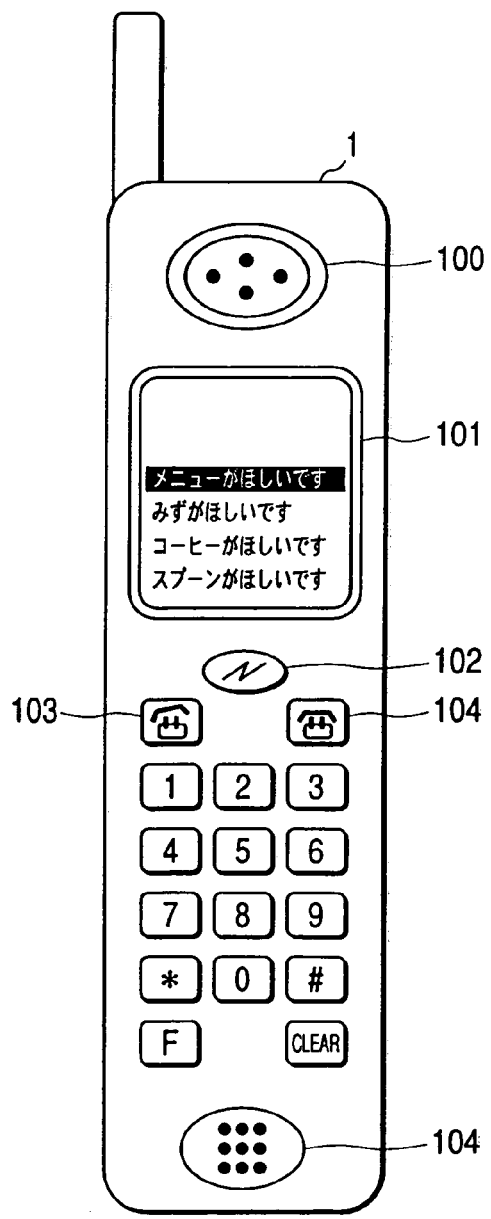
FIG. 8 illustrates an example of a recognition result assortment displayed on the display of the telephone terminal.

The recognition candidate display 19 is then actuated, and sends the contents of RECOGS (1), RECOGS (2), . . . and RECOGS (M) 205 to the telephone terminal 1 as shown in FIG. 8, and the contents are successively displayed on the display 101 of the telephone terminal 1. At this time, "1" is stored into ICNT 204 on the memory 15, and the contents of RECOGS (ICNT) are displayed on the display 101 of the telephone terminal 1 in highlight. Variable M is M=4 in this embodiment. Further, "0" is stored into INDEX 215 on the memory 15.

The user, if the user finds the first candidate as displayed, or announced, identical with, or closely resembling, what the user pronounced, fixes the selection by pressing the prescribed button to which the decision function is assigned. If the first candidate as displayed is not substantially correct, the user, for example, shifts downward the cursor to the location of the correct character string on the display 101 of the telephone terminal 1 by pressing the prescribed button to which the function of shifting the cursor is assigned. Thus, each time the user presses the button for downward shifting, the value of ICNT 204 on the memory 15 is incremented, and only the portion of memory 15 in which the content of RECOG (ICNT) is located is displayed on the display 101 of the telephone terminal 1 as highlighted. If the value of ICNT 204 surpasses M, "M" is added to the value of INDEX 215 on the memory 15, the next M candidates RECOGS (INDEX+1), RECOGS (INDEX+2), . . . and RECOGS (INDEX+M) are read out of the memory 15 and sent to the telephone terminal 1 to be successively displayed on the display 101 of the telephone terminal 1. At this time, "1" is stored into ICNT 204 on the memory 15, and the ICNTth display out of RECOGS (INDEX+1), RECOGS (INDEX+2), . . . and RECOGS(INDEX+M) is displayed on the display 101 of the telephone terminal 1 in highlight. Thereafter, the next M candidates may be sent to the telephone terminal 1, and successively displayed on the display 101 of the telephone terminal 1. Further, each time the upward shifting button is pressed, the value of ICNT 204 on the memory 15 is decremented, and only the ICNTth displayed part out of RECOGS (INDEX+1), RECOGS (INDEX+2), . . . and RECOGS (INDEX+M) on the display 101 of the telephone terminal 1 are highlighted. The structure of the sentence dictionary 20 for use in speech recognition shown in FIG. 15 is an exemplary embodiment, and other applicable methods, such as combining a grammar and a word dictionary, are also within the scope of the present invention. Additionally, the designation of the correct candidate sentence may be accomplished by forming the display 101 of the telephone terminal 1 as a touch panel display, to allow designation thereof by a touching with a finger or pointer or the like.

If the user finds the first candidate as displayed is substantially similar to what the user pronounced, the user fixes this first candidate by pressing the prescribed button to which the decision function is assigned, and stores the values of RECOGPNUM (INDEX+ICNT), RECOGSNUM (INDEX+ICNT) and RECOGS (INDEX+ICNT) on the memory 15 respectively into PCAND 213, SCAND 214 and JAPANESE 203 on the same memory 15.

As "I'd like to have a glass of water" is displayed on the second line in the example of FIG. 8, the highlighted area is shifted to the second line by pressing the downward shifting button, and the decision button is pressed. Then, the INDEX is set to "0", ICNT is set to "2", "4", "1" and "I'd like to have a glass of water", which are, respectively, the values of RECOGPNUM (2), RECOGSNNUM (2) and RECOGS (2), and these values are stored into PCAND 213, SCAND 214 and JAPANESE 203 on the memory 15.

The user can confirm the content of what was pronounced not only by displaying speech recognition candidates on the display 101 of the telephone terminal 1, as described hereinabove, but additionally by the following method. After the speech recognizer 6 stores model sentence numbers 611, sentence numbers 612 and sentences 613 into RECOGPNUM (1), RECOGSNUM (1), RECOGS (1), RECOGPNUM (2), RECOGSNUM (2), RECOGS (2), . . . , RECOGPNUM (N), RECOGSNUM (N) and RECOGS (N) 205 of the memory 15 in descending order of likelihood, the speech generator 12 is actuated. At this time, "1" is stored into JCNT 208 on the memory 15, RECOGS (JCNT) on the memory 15 is read, and the character string is converted into synthesized speech. The waveform data of the speech is converted into analog data by digital-to-analog (D/A) conversion, and the analog data is sent to the telephone terminal 1 via the speech output 13 as speech. A character string can be converted into synthesized speech using, for example, the synthesizing formula described in J. Allen, M. S. Hunnicutt, D. Kkatt et al., *From Text to Speech* (Cambridge University Press, 1987) pp. 16–150, and the waveform superposing formula described in Yagashira, "The Latest Situation of Text Speech Synthesis" (Interface, December, 1996) (in Japanese) pp. 161–165. Other text speech synthesizing formulae may be employed within the present invention. Alternatively, speech models matching recognizable model sentences may be recorded in advance and stored in a storage unit, such as a memory, such as memory 15.

The user, upon hearing from a loudspeaker 100 on the telephone terminal 1 the speech outputted, fixes the outputted speech by pressing the prescribed button to which the decision function is assigned, if the user finds the speech conforming to the content inputted. If the speech does not conform to what was pronounced, the user presses a prescribed button, to which the function to present the next candidate is assigned, on the telephone terminal 1. The speech generator 12 in the automatic interpretation server 1000, when the prescribed button is pressed to present the next candidate, increments JCNT 208 on the memory 15 to read out RECOGS (JCNT), converts the character string into synthesized speech, converts the waveform data of the speech into analog data by digital-to-analog (D/A) conversion, and sends the analog data to the telephone terminal 1 via the speech output 13 as speech.

The user, upon hearing from the loudspeaker 100 on the telephone terminal 1 the speech sent as described hereinabove, fixes the speech by pressing the prescribed button to which the decision function is assigned, if the user finds the speech conforming to the content inputted. If the speech does not conform to what the user pronounced, the user presses a prescribed button, to which the function to present the next candidate is assigned, on the telephone terminal 1, and repeats the foregoing process until the speech conforming to the content inputted is heard.

When the decision button is pressed, a character string stored in RECOGS (ICNT) on the memory 15 is stored into JAPANESE 203 on the same memory 15. Rather than press the decision button, the user may input a particular prescribed word, phrase or sentence. Thus the user, hearing from the loudspeaker 100 on the telephone terminal 1 the speech sent as described above, may fix, or not fix, the speech by pronouncing to the microphone 104 on the telephone terminal 1 a prescribed word, phrase or sentence signifying that the speech is, or is not, acceptable. The speech recognizer 6 of the automatic interpretation server 1000 recognizes this user speech by the same method as that for the sentence input described hereinabove. If each candidate presented is below a preset threshold, or the value of ICNT 204 surpasses N, collation with the command dictionary 21 is effected.

The data structure of the command dictionary 21 is shown in FIG. 16. The characteristic vector sequence of the input speech is collated with that of each item in the command dictionary 21, and the command number of the candidate having the highest percentage similarity is selected for the command. For example, if the user orally inputs "kakutei" ("fix"), a recognition attempt using the sentence dictionary 20 results in a finding, through collation of the characteristic vector of the speech and that of each item characteristic vector, that the percentage similarity is below the preset threshold, the characteristic vector of each item in the command dictionary 21 is collated to select 701 items as recognition candidates. A command number of 1 signifies that the item is an input representing "fix".

If speech is fixed, a character string stored in RECOGS (ICNT) on the memory 15 is stored into JAPANESE 203 on the same memory 15. If the speech is unfixed, JCNT 208 on the memory 15 is incremented, RECOGS (JCNT) is read, the character string is converted into synthesized speech, the waveform data of the speech is converted into analog data by D/A conversion, and the data is sent to the telephone terminal 1 through the speech output 13 as speech. This process is repeated until fixed speech is obtained.

Figures 9, 10:
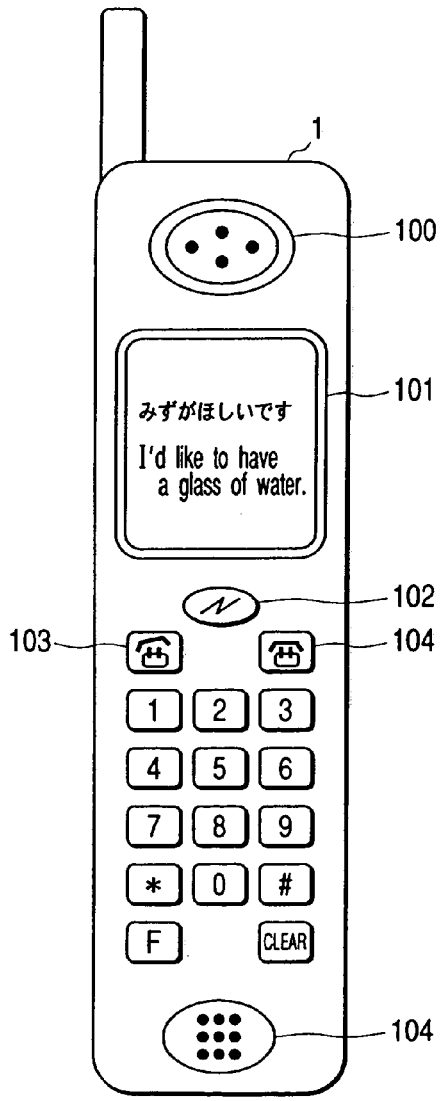
FIG. 9 illustrates an example of a structure of a table for language conversion.
FIG. 10 illustrates an example interpretation result displayed on the display of the telephone terminal.

The language translator 7 in the automatic interpretation server 1000 is then actuated. The language translator 7, using the table for language conversion 10, converts a character string stored in JAPANESE 203 on the memory 15 into another language. The operation of the language translator 7 will be described hereinbelow. The data structure of the table for language conversion 10 is shown in FIG. 9.

The language translator 7 first successively collates values stored in PCAND 213 and SCAND 214 on the memory 15, with items in the model sentence number 311 and the sentence number 312 in the table for language conversion 10, and stores the content of the column of the LANG 209 value in the translated words 312 of the identical item into RESULT 206 of the memory 15. The language translator 7 displays, as shown in FIG. 10, contents stored in JAPANESE 203 and RESULT 206 of the memory 15, on the display 101 of the telephone terminal 1. The display in FIG. 10 is shown as an example.

The values stored in PCAND 213 and SCAND 214 are respectively "4" and "1" in the example hereinabove, and those values are consistent with the item of 303 "Mizu ga hoshii desu". Furthermore, as the value of LANG 209 is "2", the matching translated words 312 "I'd like to have a glass of water" are stored into RESULT 206 of the memory 15. For conversion into translated words, in addition to the above-described method using the table for language conversion, the translation methods described in Japanese Patent Application No. 328585/1991 and in Japanese Patent Application No. 51022/1991 may be used.

The speech generator 12 in the automatic interpretation server 1000 is then actuated. The speech generator 12 reads a character string stored in ENGLISH 206 on the memory 15, converts the character string into synthesized speech, and stores waveform data into SYWAVE 207 on the memory 15. A character string may be converted into synthesized speech by, for example, the synthesizing formula described in J. Allen, M. S. Hunnicutt, D. Kkatt et al., *From Text to Speech* (Cambridge University Press, 1987) pp. 16–150 and the waveform superposing formula described in Yagashira, "The Latest Situation of Text Speech Synthesis" (Interface, December, 1996) pp. 161–165, among others. It will additionally be apparent to those skilled in the art that a speech model matching each English version to a foreign version may be created and stored onto a storage unit, such as a memory, in a compressed form, in advance of use.

The speech generator 12 then converts waveform data of the interpreted speech stored in SYNWAVE 207 on the memory 15 into analog data or packet data, sends the now-converted data to the telephone terminal 1 through the speech output 13 as speech, and stores the interpreted speech, sent as described hereinabove, into a memory of, for example, terminal 1. The interpreted speech outputted from the speech output 13 may additionally be stored onto the memory 15 of the automatic interpretation server 1000.

At this point, a predetermined charge for interpretation is preferably added to the contents of a charge column 412 matching the ID sent from the authentication server 31 for the user ID column 411 of the accounting table 33. If, for example, a charge of $0.50US per interpretation is set in advance, and the user ID is "1236", the element of the charge column 412 matching the element 403 indicating "1236" from the elements of the user ID column 411, will be updated to indicate "0.50", for example. The charge may be, for example, quoted per use of the interpretation service, or may be a fixed lump sum for which as many jobs of interpretation service as necessary are made available, or may be a charge for all interpretations during a predetermined time period available for interpretation, such as one week, one month, or one vacation period. Following each use, the then-updated charge is billed to the user of each ID. Based upon that charge, a prescribed amount may be paid to the provider of the mobile Internet access service gateway server 3 as a commission, and the remaining amount may be paid to the provider/operator/owner of the automatic interpretation server 1000.

Thus, through the use of the present invention, when the user presses a prescribed button, to which the function to output translated words is associated, on the telephone terminal 1, interpreted speech stored in the memory on the telephone terminal 1 is read, and the interpreted speech is outputted from the loudspeaker or earpiece 100 on the telephone terminal 1. However, the method for outputting interpreted speech is not limited to pressing a prescribed button, to which the function to output translated words is associated, on the telephone terminal 1, but may additionally include an audio input from the user of a prescribed word, phrase or sentence.

In the embodiment wherein the interpreted speech stored in the memory of the telephone terminal 1 is read, and is outputted from the loudspeaker 100 of the telephone terminal 1, it is preferable that no information be sent to the mobile gateway server 3, and therefore the user is billed no charge by the accounting server 32.

Figure 17:
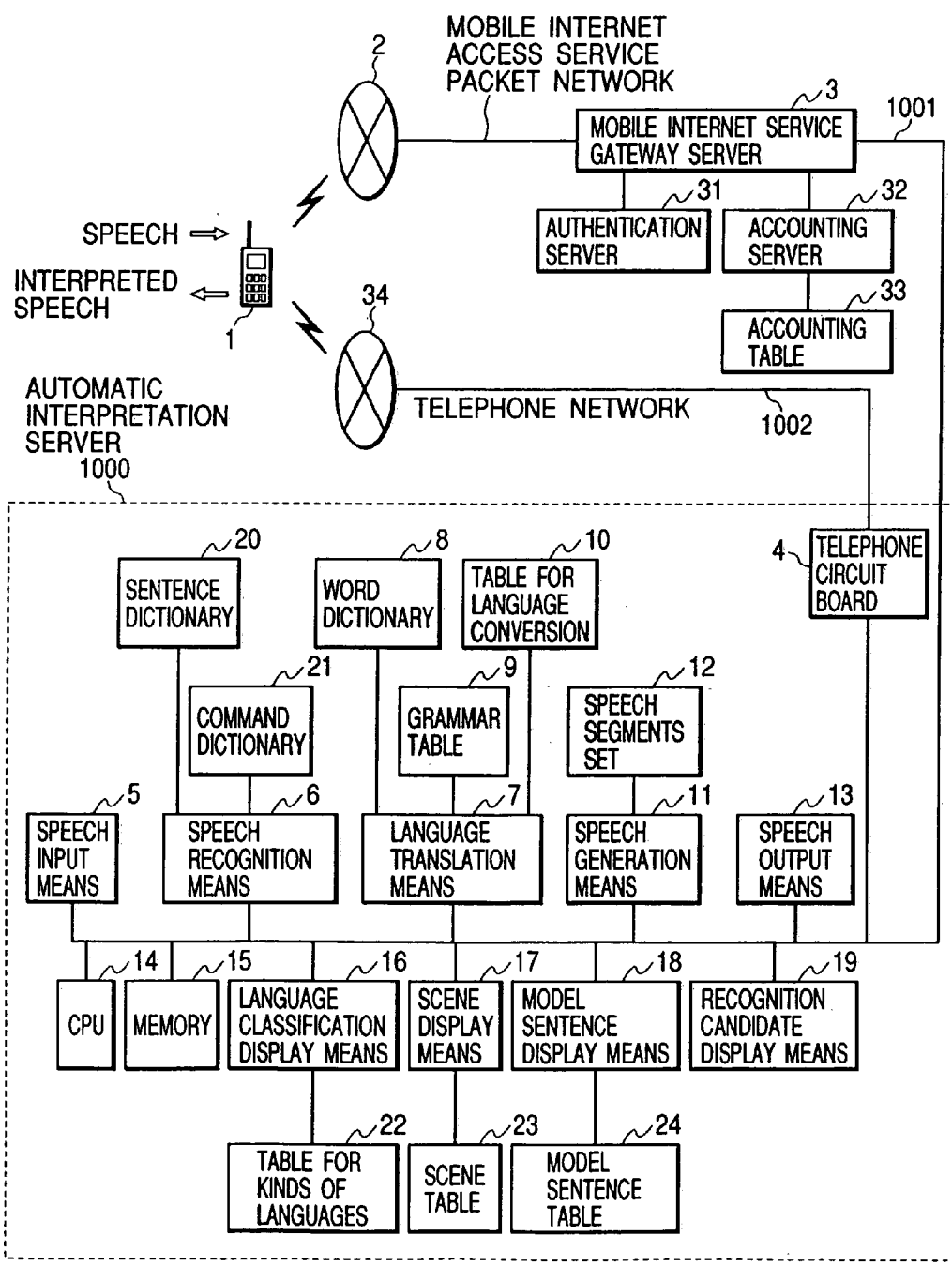
FIG. 17 illustrates the configuration of an automatic interpretation service system.

FIG. 17 is a block diagram illustrating the configuration of an automatic interpretation service system. As in the first embodiment, the server is provided with a CPU and a memory and having a configuration such as the one shown in FIG. 17, such as a personal computer or a work station. The automatic interpretation service system includes a telephone terminal 1 to which, for example, a mobile Internet access service is available, may include a mobile Internet access service packet network 2 and a mobile gateway server 3, such as an Internet access service gateway 3, and includes a telephone circuit board 4, a speech input 5, a speech recognizer 6, a language translator 7, a word dictionary 8, a grammar table 9, a table for language conversion 10, a speech generator 11, a speech segments set 12, a speech output 13, a CPU 14, a memory 15, a language classification display 16, a scene display 17, a model sentence display 18, a recognition candidate display 19, a sentence dictionary 20, a command dictionary 21, a table for languages 22, a scene table 23, a model sentence table 24, an authentication server 31, an accounting server 32, an accounting table 33, a telephone network 34, an automatic interpretation server 1000, a line connected to the mobile Internet access service packet network 1001, and a line connected to the telephone network 1002.

Referring now to FIG. 17 and FIG. 3, the power source 104 of the telephone terminal to which the mobile Internet access service is available is activated. A button 102 for establishing mobile Internet connection may then pressed, and connection to the mobile gateway server 3 is established, for example, via the mobile Internet access service packet network 2, or via a telephonic audio network 2. The user is then confirmed by the authentication server 31 to be registered for use of the service. Subsequent actions of the system, with the exception of those actions discussed hereinbelow, are substantially equivalent to the functions discussed hereinabove with respect to FIG. 1, and the figures based thereon.

With respect to FIG. 17, when a scene is fixed, the model sentence display 18 of the automatic interpretation server 1000 is actuated, and interpretable model sentences are displayed on the display 101 of the telephone terminal 1 via the line 1001 by using a model sentence table 24 as shown in FIG. 7. Simultaneously, the speech input 5 of the automatic interpretation server 1000 is actuated. The speech input 5 then enables the system to accept a speech input. The user, preferably while watching the model sentences, pronounces in Japanese, or any first language, a sentence the user desires to have interpreted in, for example, the restaurant scene, into the microphone 104 of the mouthpiece of the telephone terminal 1. For example, a sentence "Mizu ga hoshii desu" (I'd like to have a glass of water) in a restaurant scene may be desired to be interpreted into English, or any second language. The model sentence table 24 may have the data structure shown in FIG. 14, and the model sentence display 18 sends to the telephone terminal 1, out of the items of scene number 511 in the model sentence table 24, model sentences 513 of values stored in SCENE 210 on the memory 15, successively from "1" in model sentence number 512 onward, to be displayed on the display 101 of the telephone terminal 1. As "3" is stored in SCENE 210 on the memory 15 in the example cited above, model sentences 513 of which the scene number 511 is "3" in the model sentence table 24 of FIG. 14, i.e. items 501, 502, 503 and 504, "Hello", "Thank you", "Where is [ ]" and "I'd like to have [ ]" are sent to the telephone terminal 1, and M sentences at a time are successively displayed on the display 101 of the telephone terminal 1, as shown in FIG. 7. The variable M, which may be set according to the size of the display 101, is M=4 in this example.

The model sentences in this example include the pattern "I'd like to have [ ]", and thus the user inputs "I'd like to have a glass of water", thereby following the pattern of this model sentence. For this audio input from the user, a prescribed button, to which a function to trigger audio input is assigned, on the telephone terminal 1, may be pressed to enable the speech input 5 of the automatic interpretation server 1000 to accept the speech input, or the speech input 5 of the automatic interpretation server 1000 may remain enabled to accept a speech input at any time once it is actuated. A model sentence displayed may be one having a blank slot [ ] as in the above-cited example, a grammar rule or a sentence complete in itself.

In one example of the embodiment of FIG. 17, a telephone terminal incapable of handling dialogue voice and data in the same protocol is used, and thus the telephone network 20 must pass the inputted speech to the automatic interpretation server. Therefore, the user preferably establishes connection from the telephone terminal 1 to the automatic interpretation server over the line 1002 via the telephone network 34, using a different telephone number from that used for connection to the automatic interpretation server 1000 over the line 1001 via the mobile Internet access service gateway server 3. Instead of requiring the user to establish connection anew, the speech input 5 to the automatic interpretation server 1000 may automatically establish a connection to the user's telephone terminal 1. Thus, in this exemplary embodiment, speech pronounced by the user is sent to the automatic interpretation server 1000 over the line 1002 via the telephone network 34. Following this sending to the automatic interpretation server 1000, the method is substantially similar to that disclosed hereinabove with respect to FIG. 1, and the figures associated therewith.

The speech generator 12 in the automatic interpretation server 1000, upon a pressing of the button to which the function to present the next candidate is assigned, increments JCNT 208 on the memory 15, reads out RECOGS (JCNT), converts the character string into synthesized speech, converts the waveform data of the speech into analog data by D/A conversion, and sends the data to the telephone terminal 1 through the speech output 13 as speech.

When the decision button is pressed, a character string stored in RECOGS (ICNT) on the memory 15 is stored into JAPANESE 203 on the same memory 15. The signal of the decision button may be sent to the automatic interpretation server 1000 via the line 1001 or the line 1002. Rather than press this decision button, the user may pronounce a certain prescribed word, phrase or sentence. Thus, the user, upon hearing from the loudspeaker 100 on the telephone terminal 1 the speech sent as described above, fixes the speech by pronouncing to the microphone 104 on the telephone terminal 1 a prescribed word, phrase or sentence stating that the speech is to be fixed, if the user finds the speech conforming to the content inputted. If the speech does not conform to what the user pronounced, the user pronounces another prescribed word, phrase or sentence, different from that which would be pronounced in response to fix speech, and this unfixed speech is sent to the automatic interpretation server 1000 over the line 1002. The speech recognizer 6 of the automatic interpretation server 1000 preferably recognizes this unfixed speech according to the same methodology as that for a sentence input as described hereinabove. If speech is below a preset threshold, or the value of ICNT 204 surpasses N, collation with the command dictionary 21 is started. The language translator 7 in the automatic interpretation server 1000 is then actuated, and the translating operation by the language translator 7 is carried out according to the discussion hereinabove.

The language translator 7, as shown in FIG. 10, displays contents stored in JAPANESE 203 and RESULT 206 of the memory 15 on the display 101 of the telephone terminal 1 via the line 1001. The display shown in FIG. 10 is an example of a typical display.

The speech generator 12 in the automatic interpretation server 1000 is then actuated, and the operation of the speech generator 12 to generate speech is substantially the same as discussed hereinabove. The speech generator 12 converts the waveform data of interpreted speech stored in SYN-WAVE 207 on the memory 15 into analog data or packet data, sends the data as speech to the telephone terminal 1 through the speech output 13 over the line 1002, and stores the interpreted speech, sent as described, onto the memory of the telephone terminal 1.

The present invention provides an interpretation device and system that does not increase inconvenience while travelling, such as by adding to the number of personal effects, and which achieves improved accuracy of translation over existing methods, through the use of a telephone set for conversation and translation, and preferably through the use of a telephone to which mobile Internet access service is available. Other advantages and benefits of the present invention will be apparent to those skilled in the art.

The present invention is not limited in scope to the embodiments discussed hereinabove. Various changes and modifications will be apparent to those skilled in the art, and such changes and modifications fall within the spirit and scope of the present invention. Therefore, the present invention is to be accorded the broadest scope consistent with the detailed description, the skill in the art and the following claims.

What is claimed is:

1. A method for providing a speech interpretation service, comprising:
providing an interpretation server having resident thereon a plurality of registered sentences to be interpreted;
displaying, prior to receiving speech in a first language directed to the interpretation server, at least one of the plurality of registered sentences on the mobile terminal display communicatively connected to the interpretation server;
receiving the speech, in a first language, inputted to the mobile terminal displaying at least one of the plurality of registered sentences, at the interpretation server;
recognizing by the interpretation server of the speech inputted based on a comparison of the inputted speech to said displayed plurality of registered sentences;
interpreting, by the interpretation server, the recognized speech into a second language, according to said recognizing; and
outputting a translation signal correspondent to the second language to the terminal from the interpretation server;
wherein said interpretation server and said mobile terminal are communicatively connected via an internet access network and a telephone network, and wherein said internet access network is used for at least transmission of said displaying of said at least one of the plurality of registered sentences on the mobile terminal, and wherein said telephone network is used for at least transmission of said receiving the speech to be recognized.

2. The method of claim 1, wherein the registered sentences are classified in a plurality of scenes, further comprising:
receiving a scene selection of a model sentence from the scene options; and
displaying a plurality of registered sentences classified into the selected scene.

3. The method of claim 1, wherein the translation signal comprises an audio signal that is outputted via the telephone network.

4. The method of claim 1, further comprising:
receiving an approval instruction from the mobile terminal before said outputting a translation signal correspondent to the second language.

5. The method of claim 4, wherein:
the approval instruction is a press button approval instruction given at the mobile terminal, and wherein said outputting a translation signal correspondent to the second language is in accordance with the approval instruction.

6. The method of claim 4, wherein:
the approval instruction is an audio approval instruction given at the mobile terminal, and wherein the audio approval instruction is at least one selected from the group consisting of a specific spoken word, a specific spoken phrase, and a specific spoken sentence, from the speaking set; and wherein said outputting a translation signal correspondent to the second language is in accordance with the approval instruction.

7. The method of claim 6, further comprising repeating said outputting a translation signal correspondent to the second language in accordance with the approval instruction upon each receipt of the approval instruction.

8. The method of any one of claims 1, further comprising: identifying the mobile terminal based on at least one identifying characteristic; and
charging a predetermined fee to the identified mobile terminal for said interpreting.

9. The method of claim 1, wherein said displaying is in accordance with an interpretable language classification menu on the mobile terminal and said receiving, from the mobile terminal, includes a selected input of the second language from the language classification menu.

10. A speech interpretation server, comprising:
a memory in the server having stored thereon a plurality of model sentences as prescribed symbol strings;
a unit for displaying at least one of the stored plurality of registered model sentences on a display of a mobile terminal prior to receiving speech in a first language directed to a speech recognizer;
a speech input for receiving an inputted speech in a first language from the mobile terminal which is displaying at least one of the plurality of registered model sentences;
a speech recognizer that receives the inputted speech and converts the inputted speech into one of the prescribed symbol strings based on a comparison of the inputted speech to the displayed plurality of registered sentences;
a language converter that converts the inputted speech converted into the prescribed symbol string into a second language, wherein the second language is different from the first language; and
a speech output that outputs the second language in audio to the mobile terminal;
wherein said speech input and said mobile terminal are communicatively connected via an internet access network and a telephone network, and wherein said internet access network is used for at least transmission to the display of the mobile terminal of said at least one of the plurality of registered sentences, and wherein said telephone network is used for at least transmission to said speech recognizer.

11. The speech interpretation server of claim 10, wherein said memory comprises:
a command sentence table, including a plurality of command sentences each of which corresponds to a function of the mobile terminal, wherein said speech recognizer differentiates the plurality of model sentences from the plurality of command sentences.

12. The speech interpretation server of claim 10, wherein each of the plurality of model sentences is classified according to a scene of use.

13. The speech interpretation server of claim 10, wherein said speech output comprises a speech synthesizer output that outputs the second language to the mobile terminal in audio.

14. The speech interpretation server of claim 10, further comprising:
an authorizer, wherein said authorizer identifies the mobile terminal based on at least one identifying characteristic; and
a billing database, wherein the mobile terminal correspondent to the at least one identifying characteristic is billed by said billing database for use of the speech interpretation server for a predetermined time.

15. A speech interpretation service, comprising:
a communications server;
a mobile terminal connected to the communication server, wherein the communication server comprises:
a model sentence table for storing a plurality of model sentences,
a speech input for receiving an inputted speech in a first language from said mobile terminal which is displaying at least one of the model sentences;
a speech recognizer that receives the inputted speech and converts the inputted speech into a prescribed symbol string that is present among the plurality of displayed model sentences;
a language converter that converts the inputted speech converted into the prescribed symbol string into a second language, wherein the second language is different from the first language; and
a speech output that outputs the second language to said mobile terminal;
wherein the terminal comprises a display that displays at least one selected only from the plurality of model sentences when the speech is inputted; and
wherein said speech input and said mobile terminal are communicatively connected via an internet access network and a telephone network, and wherein said internet access network is used for at least transmission to the display of the mobile terminal of said at least one of the plurality of registered sentences, and wherein said telephone network is used for at least transmission to said speech recognizer.

* * * * *